United States Patent
Bagepalli et al.

(10) Patent No.: US 8,083,464 B2
(45) Date of Patent: Dec. 27, 2011

(54) STACKABLE NACELLE FOR WIND TURBINES

(75) Inventors: Bharat S. Bagepalli, Niskayuna, NY (US); Scott W. Blackwell, Albany, NY (US)

(73) Assignee: General Electric Company, Schenectady, NY (US)

(*) Notice: Subject to any disclaimer, the term of this patent is extended or adjusted under 35 U.S.C. 154(b) by 1003 days.

(21) Appl. No.: 12/021,478

(22) Filed: Jan. 29, 2008

(65) Prior Publication Data

US 2009/0191051 A1 Jul. 30, 2009

(51) Int. Cl.
*F03D 11/00* (2006.01)

(52) U.S. Cl. ........... 415/4.2; 415/4.4; 415/4.5; 415/232; 415/905; 415/907

(58) Field of Classification Search .................... 415/4.2, 415/4.4, 4.5, 232, 905, 907
See application file for complete search history.

(56) References Cited

U.S. PATENT DOCUMENTS

| 3,786,982 | A | * | 1/1974 | Rakes et al. | 229/406 |
| 5,377,860 | A | * | 1/1995 | Littlejohn et al. | 220/790 |
| 5,693,388 | A | * | 12/1997 | Castner et al. | 428/35.7 |
| 5,947,321 | A | * | 9/1999 | Vadney | 220/367.1 |
| 5,950,854 | A | * | 9/1999 | Rider et al. | 220/4.23 |
| 6,554,147 | B1 | * | 4/2003 | Maida et al. | 220/4.23 |
| 7,597,206 | B2 | * | 10/2009 | Atkins et al. | 220/4.23 |

FOREIGN PATENT DOCUMENTS

WO 2007132408 A2 11/2007

* cited by examiner

*Primary Examiner* — Igor Kershteyn
(74) *Attorney, Agent, or Firm* — William F. Heinze; Ernest G. Cusick; Frank A. Landgraff

(57) ABSTRACT

A stackable nacelle for a wind turbine includes a first piece having a top wall and integral first side walls extending at a first obtuse angle from each edge of the top wall; and a second piece, for mating with the first piece, having a bottom wall and integral second side walls extending at a second obtuse angle from each edge of the bottom wall.

20 Claims, 3 Drawing Sheets

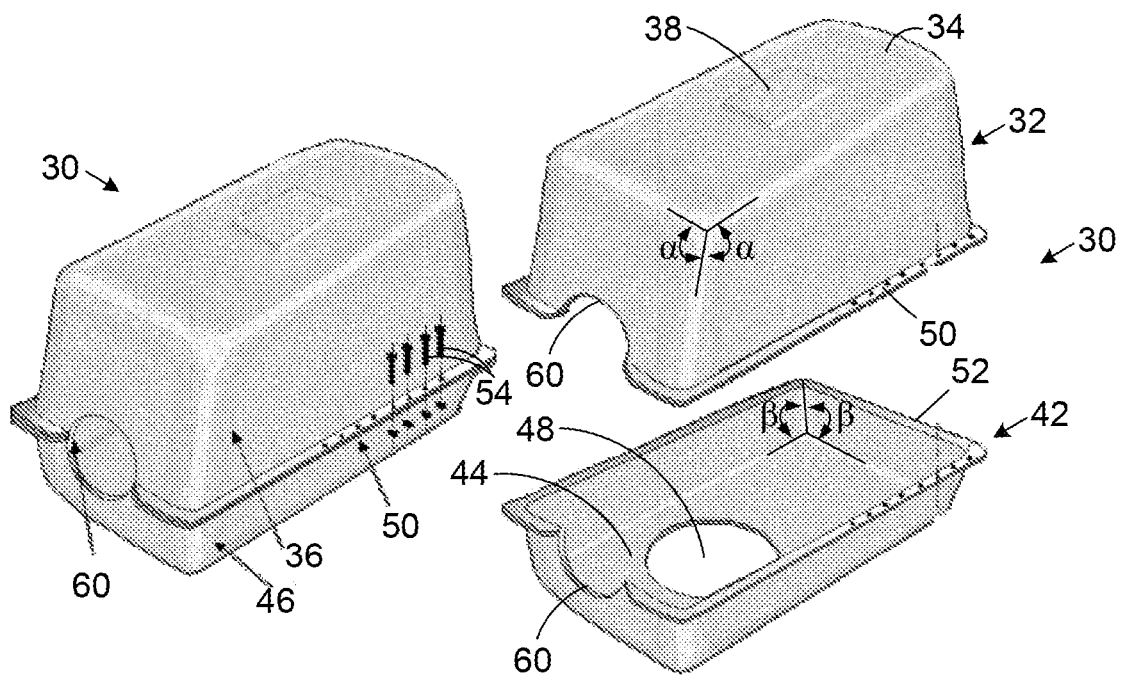
FIG. 2
FIG. 3
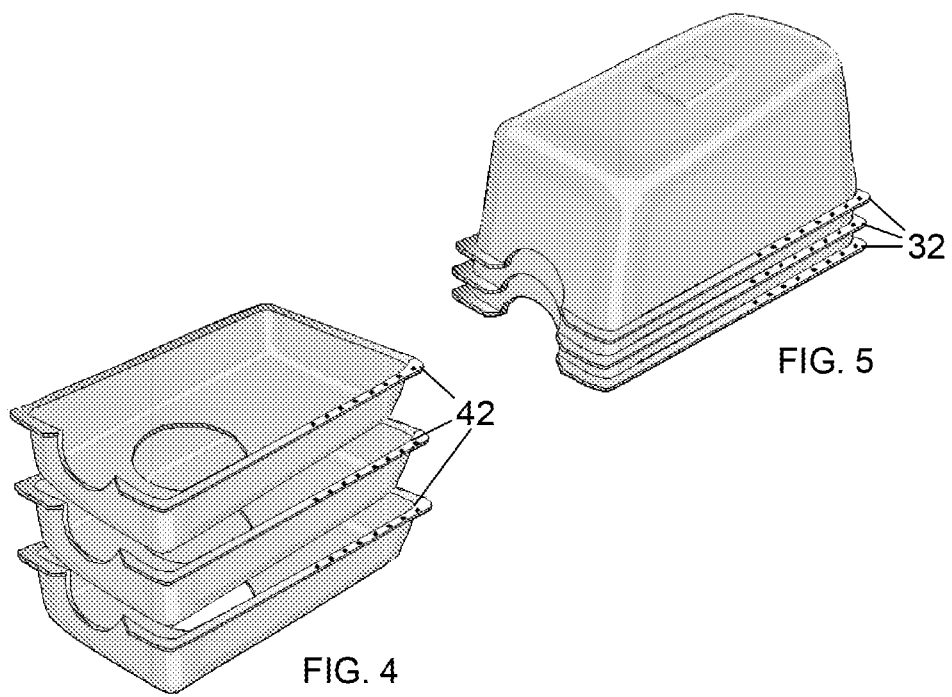
FIG. 4
FIG. 5

STACKABLE NACELLE FOR WIND TURBINES

BACKGROUND OF THE INVENTION

1. Technical Field

The subject matter described here generally relates to wind turbines, and, more particularly, to stackable nacelles for wind turbines.

2. Related Art

A wind turbine is a machine for converting the kinetic energy in wind into mechanical energy. If that mechanical energy is used directly by machinery, such as to pump water or to grind wheat, then the wind turbine may be referred to as a windmill. Similarly, if the mechanical energy is further transformed into electrical energy, then the turbine may be referred to as a wind generator or wind power plant.

Wind turbines use one or more airfoils in the form of a "blade" to generate lift and capture momentum from moving air that is them imparted to a rotor. Each blade is typically secured at its "root" end, and then "spans" radially "outboard" to a free, "tip" end. The front, or "leading edge," of the blade connects the forward-most points of the blade that first contact the air. The rear, or "trailing edge," of the blade is where airflow that has been separated by the leading edge rejoins after passing over the suction and pressure surfaces of the blade. A "chord line" connects the leading and trailing edges of the blade in the direction of the typical airflow across the blade. The length of the chord line is simply the "chord."

Wind turbines are typically categorized according to the vertical or horizontal axis about which the blades rotate. One so-called horizontal-axis wind generator is schematically illustrated in FIG. 1 and available from GE Energy of Atlanta. Ga. USA. This particular configuration for a wind turbine 2 includes a tower 4 supporting a drive train 6 with a rotor 8 that is covered by a protective enclosure referred to as a "nacelle" 20. The blades 10 are arranged at one end of the rotor 8, outside the nacelle 20, for driving a gearbox 12 connected to an electrical generator 14 at the other end of the drive train 6 arranged inside the nacelle along with a control system 16. An anemometer 18 is also provided on the nacelle 20 for providing information to the control system 16.

Modern nacelles 20 are typically assembled at a factory and then transported individually to each wind turbine 2 installation. As discussed in WIPO International Publication No. WO2007/132408, increasingly larger wind turbines require larger and larger nacelles with resulting transport difficulties. To address this problem, modern nacelles are sometimes assembled on-site from a kit including, among other things, smaller plate-shaped elements that are assembled by means of mountings at the place of use. However, such conventional techniques still require substantial logistical and assembly resources to implement at the factory and wind turbine 2 installation.

BRIEF DESCRIPTION OF THE INVENTION

These and other aspects of such conventional approaches are addressed here by providing, in various embodiments, a stackable nacelle for a wind turbine, including a first piece having a top wall and integral first side walls extending at a first obtuse angle from each edge of the top wall; and a second piece, for mating with the first piece, having a bottom wall and integral second side walls extending at a second obtuse angle from each edge of the bottom wall.

BRIEF DESCRIPTION OF THE DRAWINGS

Various aspects of this technology invention will now be described with reference to the following figures ("FIGs.") which are not necessarily drawn to scale, but use the same reference numerals to designate corresponding parts throughout each of the several views.

FIG. 2 is an orthographic view of a stackable nacelle.

FIG. 3 is an exploded orthographic view of the nacelle shown in FIG. 2.

FIG. 4 is an exploded orthographic view of stacked portions of the nacelle shown in FIGS. 2 and 3.

FIG. 5 is an orthographic view of stacked portions of the nacelle shown in FIGS. 2 and 3.

DETAILED DESCRIPTION OF THE INVENTION

Figure 1:
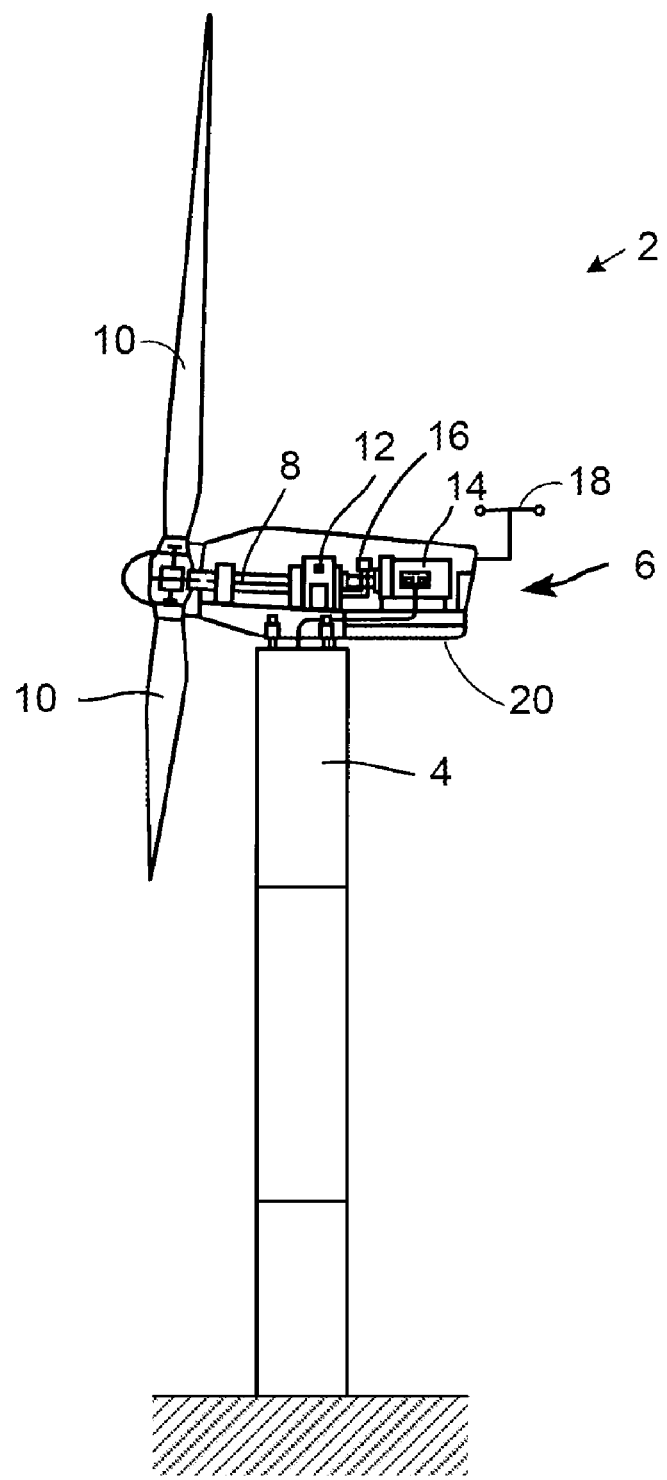
FIG. 1 is a schematic side view of a conventional wind turbine.

FIGS. 2 and 3 are orthographic views of one, non-limiting embodiment of a stackable nacelle 30 for use with the wind turbine 2 shown in FIG. 1, or any other wind turbine. For example, the nacelle 30 may be used to replace or enhance the nacelle 20 for the wind turbine 2 shown in FIG. 1 and/or any other wind turbine.

The nacelle 30 can be made from any suitable material, including polyvinyl chloride and/or other plastics, such as polyester, vinylester, epoxy, and epoxy hybrid resins. Various reinforcing materials may also be used with these materials, including glass, metal, and/or carbon fibers. Furthermore, various manufacturing techniques may be used to configure these materials, including hand lay-up and/or spray lay-up. The nacelle 30 may also be formed from metal, such as sheet metal.

In the examples illustrated here, the stackable nacelle 30 for a wind turbine tower includes a first (or top) piece 32 having a top (or base) wall 34 and integral first side walls 36 extending at a first obtuse angle α from each edge of the top wall 34. Although the illustrated first angles α are substantially the same for each of the side walls 46, different angles may also be used. An optional nameplate contour 38 is also provided in the form of a blister or bump on top wall 34. Additional contours, opening, doors, hatches, vents and/or other surface features may also be provided near the nameplate contour 38 and/or in various other locations that will not significantly affecting the stackability of the nacelle 20.

A second (or bottom) piece 42 is provided for mating with the first piece 32 as best shown in FIG. 3. The second piece 42 includes a bottom (or base) wall 44 and integral second side walls 46 extending at a second obtuse angle β from each edge of the bottom wall 44. Although the illustrated second angles β are substantially the same for each of the side walls 46, different angles may also be used. The second piece may be provided with a bottom opening 48 for connecting to the top of the wind turbine tower 4 shown in FIG. 1. Although a two-piece configuration is illustrated here for simplicity, any other number of pieces may also be provided. The first and second pieces 32 and 42 (in the two-piece arrangement) can be configured as the same or dissimilar sizes. The two (or more) pieces 32 and 42 may also be designed for different loads. For example, the second (bottom) piece 42 may be provided with thicker walls for carrying heavier loads.

A first flange 50 extends from a free end of the first side walls 36, and a second flange 52 extends from a free end of the second side walls 46 for securing to the first flange 50. In addition to allowing the first and second pieces 32 and 42 to be easily secured, the flanges 50 help to enhance their structural rigidity. The illustrated examples show the flanges 50 and 52 extending around the nacelle 20 arranged in a single, substantially horizontal plane. That substantially horizontal plane will typically be arranged substantially parallel to the rotor 8, which is often inclined at an angle of about four degrees relative to ground. The substantially horizontal plane may also be angled upward or downward in a wide range from be from about negative ten to positive ten degrees, and a narrower range of about one to five degrees.

The flanges 50 and 52 may extend outward (as shown in these Figures) or inward into the nacelle 20. While such outwardly-extending flanges 50 and 52 generally enhance stackability, inwardly-extending flanges help to provide a smooth outer surface at the joint between the first and second pieces 32 and 42. The outwardly-extending flanges 50 and 52 are tapered or otherwise angled in order to deflect rain, and/or other precipitation, from the seal between the flanges. For example, the flanges 50 and 52 may be angled in the same generally downward direction when joined together. Alternatively, the exposed top surface of the (upper) flange 50 may be angled downward and/or both surfaces of the joined flanges 50 and 52 may be angled in opposite directions so as achieve a pointed taper configuration. An appropriate seal or sealant may be provided between the flanges 50 and 52. Alternatively, a flangeless and/or seal-less interface may also be used.

A fastener 54 may be provided for securing the first flange 50 to the second flange 52. For example, the fastener 54 may include a bolt and nut that fit through corresponding holes in the flanges 50 and 52 as illustrated in FIG. 2. However, a wide variety of other fasteners may also be used, including screws, nails, clips, brackets, snaps, hooks, loops, hook and loop fasteners, adhesive, solder, welding, brazing, and/or other fasteners. The first and second flanges 50 and 52 may be further provided with a variety of alignment mechanisms such tongue and groove mechanisms, seams, and/or seals, such a weatherproof neoprene strips.

In the examples illustrated here, each of the first and second pieces 32 and 42 is provided with a semicircular side opening 60 in the corresponding side walls 36 and 46 for accommodating the rotor 8 extending from the nacelle 30. In this configuration, the seam-line or joint between the two flanges 50 and 52 can be arranged to fall roughly midway between the top and bottom walls 24 and 44 and/or substantially parallel to the rotor 8, top wall 34, or ground, further aiding the ease of assembly the nacelle 30 around the rotor 8. However, a variety of configurations for the side opening 60 may also be provide for allowing the rotor 8 to extend from the nacelle 30. In addition, each of the first and second pieces 32 and 42 is provided with rounded corners where the top wall 34 and bottom wall 44 join respective side walls 36 and 46.

Figure 6:
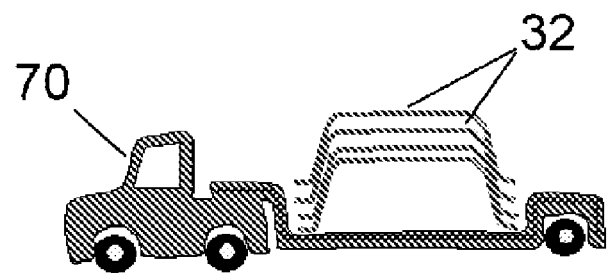
FIG. 6 is a schematic side view of a vehicle with the stacked nacelle portions shown in FIG. 5.
Figure 7:
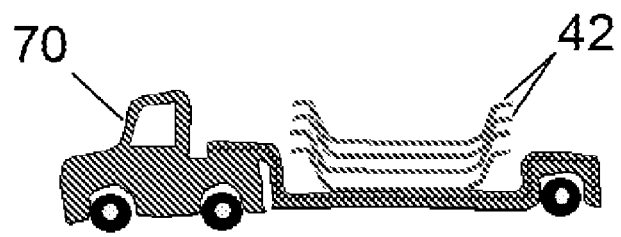
FIG. 7 is a schematic side view of a vehicle with the stacked nacelle portions shown in FIG. 4.

As illustrated in FIGS. 4 and 5, the obtuse angles α and β of the side walls 36 and 46 relative to the corresponding top and bottom walls 34 and 44 facilitates stacking of the first and second pieces 32 and 42. The nacelles 30 may then be transported by vehicles 70 in the relatively compact stack stacks illustrated in FIGS. 6 and 7. For example, the angles α and β may be substantially the same in order to facilitate stacking of the second piece 34 in the first piece 32, and/or vice versa. The first piece 32 top and the second piece 42 (in a two-piece arrangement) can also be configured with dissimilar taper angles α and β. For example, a larger angle β on the shorter, second (bottom) piece 46 illustrated here, with and a smaller angle α one on the taller first (top) piece 36 would further facilitate nesting of the first and second pieces together.

The technology discussed above offer various advantages over conventional approaches. For example, the stackable nacelle 30 is a relatively simple assembly of two (or more) pieces with tapered walls which facilitate easy stacking for low-cost transportation and storage of multiple units and/or components thereof.

It should be emphasized that the embodiments described above, and particularly any "preferred" embodiments, are merely examples of various implementations that have been set forth here to provide a clear understanding of various aspects of this technology. It will be possible to alter many of these embodiments without substantially departing from scope of protection defined solely by the proper construction of the following claims.

What is claimed is:

1. A wind turbine comprising:
   a tower;
   a stackable nacelle arranged on the tower;
   a gearbox connected to an electrical generator arranged in the nacelle;
   a plurality of blades for rotating the gearbox;
   wherein the nacelle comprises:
      a first piece having a top wall and integral first side walls extending at a first obtuse angle from each edge of the top wall; and
      a second piece, for mating with the first piece, having a bottom wall and integral second side walls extending at a second obtuse angle from each edge of the bottom wall.

2. The wind turbine recited in claim 1, further comprising a first flange extending from a free end of the first side walls; and
   a second flange, extending from a free end of the second side walls, for securing to the first flange.

3. The wind turbine recited in claim 2, wherein the first and second pieces mate in a substantially horizontal plane.

4. The wind turbine recited in claim 1, wherein the first obtuse angle is substantially the same as the second obtuse angle.

5. The wind turbine recited in claim 2, wherein the first obtuse angle is substantially the same as the second obtuse angle.

6. The wind turbine recited in claim 3, wherein the first obtuse angle is substantially the same as the second obtuse angle.

7. The wind turbine recited in claim 3, wherein the first and second flanges extend outwardly from the respective top and bottom walls, and at least one of the first and second flanges includes a surface that is angled from the horizontal plane for deflecting precipitation.

8. The wind turbine recited in claim 6, wherein the first and second flanges extend outwardly from the respective top and bottom walls, and at least one of the first and second flanges includes a surface that is angled from the horizontal plane for deflecting precipitation.

9. The wind turbine tower recited in claim 4, wherein the top and bottom walls join the respective first and second side walls at rounded corners.

10. The wind turbine recited in claim 5, wherein the top and bottom walls join the respective first and second side walls at rounded corners.

11. A wind turbine, comprising:
    a tower;
    a stackable nacelle arranged on the tower;
    a gearbox connected to an electrical generator arranged in the nacelle;
    a plurality of blades for rotating the gearbox;
    wherein the nacelle comprises:

a first piece having a substantially rectangular first base wall and integral first side walls extending at a first obtuse angle from each edge of the first wall;

a second piece, for mating with the first piece, having a substantially rectangular second base wall and integral second side walls extending at a second obtuse angle from each edge of the second base wall; and at least one of the first and second side walls having a side opening for receiving a rotor.

12. The wind turbine recited in claim 11, further comprising a bottom opening, arranged in one of first and second base walls, for connecting to a tower.

13. The wind turbine recited in claim 12, further comprising:

a first flange extending from a free end of the first side walls; and a second flange, extending from a free end of the second side walls, for securing to the first flange.

14. The wind turbine recited in claim 13, wherein the first and second pieces mate in a substantially horizontal plane.

15. The wind turbine recited in claim 14, wherein the first and second base walls join respective first and second side walls at rounded corners.

16. The wind turbine recited in claim 15, wherein the first obtuse angle is substantially the same as the second obtuse angle.

17. The wind turbine recited in claim 13, wherein the first obtuse angle is substantially the same as the second obtuse angle.

18. The stackable nacelle for a wind turbine recited in claim 14, wherein the first obtuse angle is substantially the same as the second obtuse angle.

19. A stackable nacelle for a wind turbine, comprising:

a first piece having a substantially rectangular first base wall and integral first side walls extending at a first obtuse angle from each edge of the first wall;

a second piece, for mating with the first piece, having a substantially rectangular second base wall and integral second side walls extending at a second obtuse angle from each edge of the second base wall; and at least one of the first and second side walls having a side opening for receiving a rotor;

wherein the side opening comprises a recess arranged in a free edge of each of mating first and second side walls.

20. The stackable nacelle for a wind turbine recited in claim 19, further comprising a bottom opening, arranged in one of first and second base walls, for connecting to a tower.

* * * * *